(12) United States Patent
Mukaiyama et al.

(10) Patent No.: US 6,970,923 B1
(45) Date of Patent: Nov. 29, 2005

(54) DEVICE MANAGEMENT NETWORK SYSTEM MANAGEMENT SERVER AND COMPUTER READABLE MEDIUM

(75) Inventors: Masanori Mukaiyama, Nagano (JP); Nobuhiro Gunji, Nagano (JP); Toshihiko Takizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/541,593

(22) Filed: Apr. 3, 2000

(30) Foreign Application Priority Data

Apr. 1, 1999 (JP) ............................... 11-095080
Feb. 9, 2000 (JP) ............................. 2000-031323

(51) Int. Cl.7 ........................................... G06F 15/173
(52) U.S. Cl. ...................... 709/223; 709/224; 358/1.15
(58) Field of Search ............................... 709/223–224, 709/226, 221, 220, 228, 231, 203, 219; 707/10, 707/500, 501; 370/254, 255; 358/1.15

(56) References Cited

U.S. PATENT DOCUMENTS

| | | | | |
|---|---|---|---|---|
| 5,798,738 A | * | 8/1998 | Yamada ...................... 345/2.3 |
| 5,946,457 A | * | 8/1999 | Nakai et al. ................ 358/1.13 |
| 6,003,078 A | * | 12/1999 | Kodimer et al. ............ 709/224 |
| 6,301,016 B1 | * | 10/2001 | Matsueda et al. ........... 358/407 |
| 6,308,205 B1 | * | 10/2001 | Carcerano et al. .......... 709/221 |
| 6,330,611 B1 | * | 12/2001 | Itoh et al. ................... 709/229 |
| 6,360,255 B1 | * | 3/2002 | McCormack et al. ....... 709/221 |
| 6,418,469 B1 | * | 7/2002 | Justice et al. ............... 709/224 |
| 6,430,612 B1 | * | 8/2002 | Iizuka ......................... 709/223 |
| 6,477,567 B1 | * | 11/2002 | Ohara ......................... 709/223 |
| 6,490,052 B1 | * | 12/2002 | Yanagidaira ............... 358/1.15 |
| 6,560,621 B2 | * | 5/2003 | Barile ......................... 715/513 |
| 6,597,469 B1 | * | 7/2003 | Kuroyanagi ............... 358/1.15 |
| 6,631,407 B1 | * | 10/2003 | Mukaiyama et al. ....... 709/223 |
| 6,738,841 B1 | * | 5/2004 | Wolff .......................... 710/62 |
| 6,741,371 B1 | * | 5/2004 | Naito ......................... 358/471 |

FOREIGN PATENT DOCUMENTS

JP 07-212361 8/1995
JP 10-164181 6/1998

\* cited by examiner

*Primary Examiner*—Abdullahi E. Salad
(74) *Attorney, Agent, or Firm*—Sughrue Mion, PLLC

(57) ABSTRACT

Disclosed is a device management network system that is capable of monitoring all abnormalities that has occurred in a network device. The device management network system includes a management server, client devices, and network devices to be managed. The management server, when receiving a device-details screen request from a certain client device running a Web browser, collects MIB objects from the printing device specified by the information in the device-details screen request. Then, the management server provides the client device with data which causes the Web browser to display the device-details screen containing information about all abnormalities that has occurred in the printing device.

10 Claims, 13 Drawing Sheets

FIG. 8
| prtAlertSeverityLevel | prtAlertTrainingLevel | STATUS LEVEL IMAGE |
|---|---|---|
| other | | 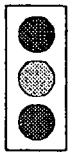<br>(GREEN SIGNAL) |
| warning | | 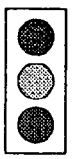<br>(YELLOW SIGNAL) |
| critical | NOT fieldservice | 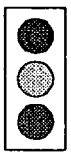<br>(RED SIGNAL) |
| critical | fieldservice |  |
| communication error | |  |

FIG. 9

| prtMakerTech | CATEGORY | PRINTER IMAGE |
|---|---|---|
| eletrophotographicLaser, electrophotographicLED, electrophotographicOther, pen, thermalTransfer, thermalDiffusive, thermalOther, electrostatic, | SPECIFIC DEVICE | SPECIFIC IMAGE |
| electroerosion, photographicMicrofiche, photographicImagesetter, photographicOther, ionDeposition, eBeam, typesetter | Page | 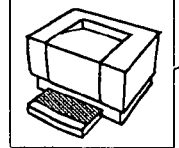 34a |
| inkjetAqueous, inkjetsolid, inkjetOther | IJP | 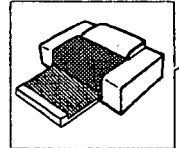 34b |
| impactMovingHeadDotMatrix9pin, impactMovingHeadDotMatrix24pin, impactMovingHeadDotMatrixOther, impactMovingHeadFullyFormed, impactBand, impactOther | SIDM | 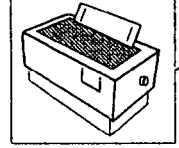 34c |

FIG. 10
| Status | hrPrinter Status | hrPrinterDetected ErrorState | CATEGORY | ERROR IMAGE | |
|---|---|---|---|---|---|
| down | other | jammed | PAPER JAMMED |  | — 35a |
| | | noPaper | NO PAPER | 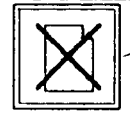 | — 35b |
| | | noToner | NO TONER / NO INK |  | — 35c |
| | | | |  | — 35d |
| | | coverOpen | COVER OPEN |  | — 35e |
| down | other | OTHERS | OTHER ERRORS | | — 35f |

FIG. 12

| prtAlertGroup | prtAlertCode | STATUS DESCRIPTION STRING |
|---|---|---|
| generalPrinter | coverOpen | Cover Open |
| | coverClosed | Cover Closed |
| | interlockOpen | Interlock Open |
| | interlockClosed | Interlock Closed |
| | configurationChange | Printer Configuration Changed |
| | jam | Paper Jammed |
| | doorOpen | Cover Open |
| | doorClosed | Cover Closed |
| | powerUp | Error Occurred |
| | powerDown | Error Occurred |
| | other/unknown | Error Occurred |
| cover | coverOpen | Cover Open |
| | coverClosed | Cover Closed |
| | interlockOpen | Interlock Open |
| | interlockClosed | Interlock Closed |
| | configurationChange | Printer Configuration Changed |
| | jam | Paper Jammed |
| | other/unknown | Error Occurred |
| input | coverOpen | Paper Feeder Cover Open |
| | coverClosed | Paper Feeder Cover Closed |
| | interlockOpen | Paper Feeder Interlock Open |
| | interlockClosed | Paper Feeder Interlock Closed |
| | configurationChange | Paper Feeder Configuration Changed |
| | jam | Paper Jammed |
| | inputMediaTrayMissing | Paper Feeding Error Occurred |
| | inputMediaSizeChange | Paper Size Altered |
| | other/unknown | Paper Feeding Error Occurred |
| output | coverOpen | Cover Open |
| marker | coverOpen | Cover Open |
| markerSupplies | coverOpen | Cover Open |
| markerColorant | coverOpen | Cover Open |
| mediaPath | coverOpen | Cover Open |
| interpreter | configurationChange | Printer Configuration Changed |

DEVICE MANAGEMENT NETWORK SYSTEM MANAGEMENT SERVER AND COMPUTER READABLE MEDIUM

BACKGROUND OF THE INVENTION

1. Field of the Invention

The present invention relates to a device management network system for managing operation status of network devices, a management server for constructing the device management network system, and a computer readable medium stored with a program which causes a computer to operate as the management server.

2. Description of the Related Art

In recent years, due to price reduction in computers and LAN related devices, many companies are pursuing networking of various kinds of devices for business use, such as personal computers, printers, fax machines, etc. As a result, a task of administrating the network has attained considerable importance in order to maintain the conduct of business, and therefore, network systems have been developed, each of which allows a network administrator to inquire the operation status of network devices with his own computer.

For example, known is a network system attached a administration server which, when receiving a particular HTTP request from a client device running a Web browser, obtains information about operation status from a network printer, and creates and sends HTML data representing the operation status of the network printer to the client device.

This network system allows a user (a network administrator) to inquire the operation status of any network printer with his client device (Web browser). However, in the network system, even if two or more abnormalities (errors) has occurred in a network printer, the administration server sends back HTML data reporting that only one abnormality (an abnormality with the highest priority among the abnormalities actually occurred in the network printer) has occurred in the network printer to the client device. That is, this conventional network system has disadvantages in that the user cannot grasp every abnormality that has occurred in the network printer.

SUMMARY OF THE INVENTION

Accordingly, an object of the present invention is to provide a device management network system capable of monitoring all abnormalities that has occurred in a network device by a Web browser and a management server capable of implementing such a device management network system. Another object of the present invention is to provide a computer readable medium stored with a program that causes a computer to operate such a management server.

To achieve the above-mentioned objects, in constructing a device management network system including a management server, one or more network devices to be managed, and one or more client devices each having a Web browser, the present invention uses, as each of the one or more network devices, a status information storing part for storing status information; a monitoring part for monitoring predetermined parts to determine whether each of the predetermined parts is functioning properly, and updating the status information stored in the status information storing part so as to include information about all abnormalities that have occurred in the predetermined parts based on monitoring results.

As the management server, the present invention uses an apparatus including a status information obtaining part for, when receiving a device-details screen request containing identification information of a network device among one or more network devices from a client device running a web browser, obtaining status information stored in the status storing part of the network device identified by the identification information in the device-details screen request by sending the status information request to the network device; a specifying part for specifying all abnormalities that has occurred in the network device identified by the identification information in the device-details screen request based on the status information obtained by the information obtaining part; and an information sending part for sending information indicating all abnormalities specified by the specifying part to the client device that has sent the device-details screen request.

According to this device management network system, it is possible to monitor all abnormalities that have occurred in the network device with the client device having the Web browser.

In realizing the device management network system of the present invention, it is possible to adopt the information sending part of management server, which sends information containing names of image files associating with the abnormalities specified by specifying part.

Furthermore, in the case where the status information in the status information storing part of a network device contains type information of the network device, it is possible to add to the management server an image storing part for storing a plurality of image files, each of which corresponds to a type information and holds image data representing outside appearance of a network device related to the corresponding type information; and an image sending part for selecting from the plurality of image files stored in the image storing part an image file corresponding to the type information in the status information obtained by the status information obtaining part, and sending data in the selected image file to the client device that has sent the device-details screen request.

Also, in realizing the device management network system of the present invention, the management server may additionally have the functions of a client device, that is, Web browser. The network devices of the present device management network system may be of any kind. For example, network printers, each of which can respond to the status information request from the management server, may be used as network devices.

In another aspect, a management server of the present invention is apparatus to be attached to a network including one or more network devices to be managed, and one or more client devices having a Web browser, the management server comprising: a status information obtaining part for, when receiving a device-details screen request containing identification information of a network device among one or more network devices from a client device running a Web browser, obtaining status information from the network device identified by the identification information in the device-details screen request; a specifying part for specifying all abnormalities that has occurred in the network device identified by the identification information in the device-details screen request based on the status information obtained by the information obtaining part; and an information sending part for sending information indicating all abnormalities specified by the specifying part to the client device that has sent the device-details screen request.

Use of this management server in combination of network devices equipped with the above-mentioned parts leads to a device management network system that is capable of monitoring all abnormalities in any network device.

In another aspect, a computer readable medium of the present invention stores a program for causing a computer to function as the management server of the present invention. Accordingly, by installing the program stored on this computer readable medium onto a computer, the resultant computer can function as the management server of the present invention.

BRIEF DESCRIPTION OF THE DRAWINGS

These and other objects and advantages of the present invention will become clear from the following description with reference to the accompanying drawings, wherein:

FIG. 8 is a figure illustrating status level images stored in the management server;

FIG. 9 is a figure illustrating printer images stored in the management server;

FIG. 10 is a figure illustrating error images stored in the management server;

FIG. 12 is a figure illustrating a status description string table stored in the management server.

DETAILED DESCRIPTION OF THE PREFERRED EMBODIMENTS

An embodiment of the present invention will hereinafter be described with reference to the drawings.

First, the outline of the device management network system will be explained with reference to FIGS. 1 and 2.

Figure 1:
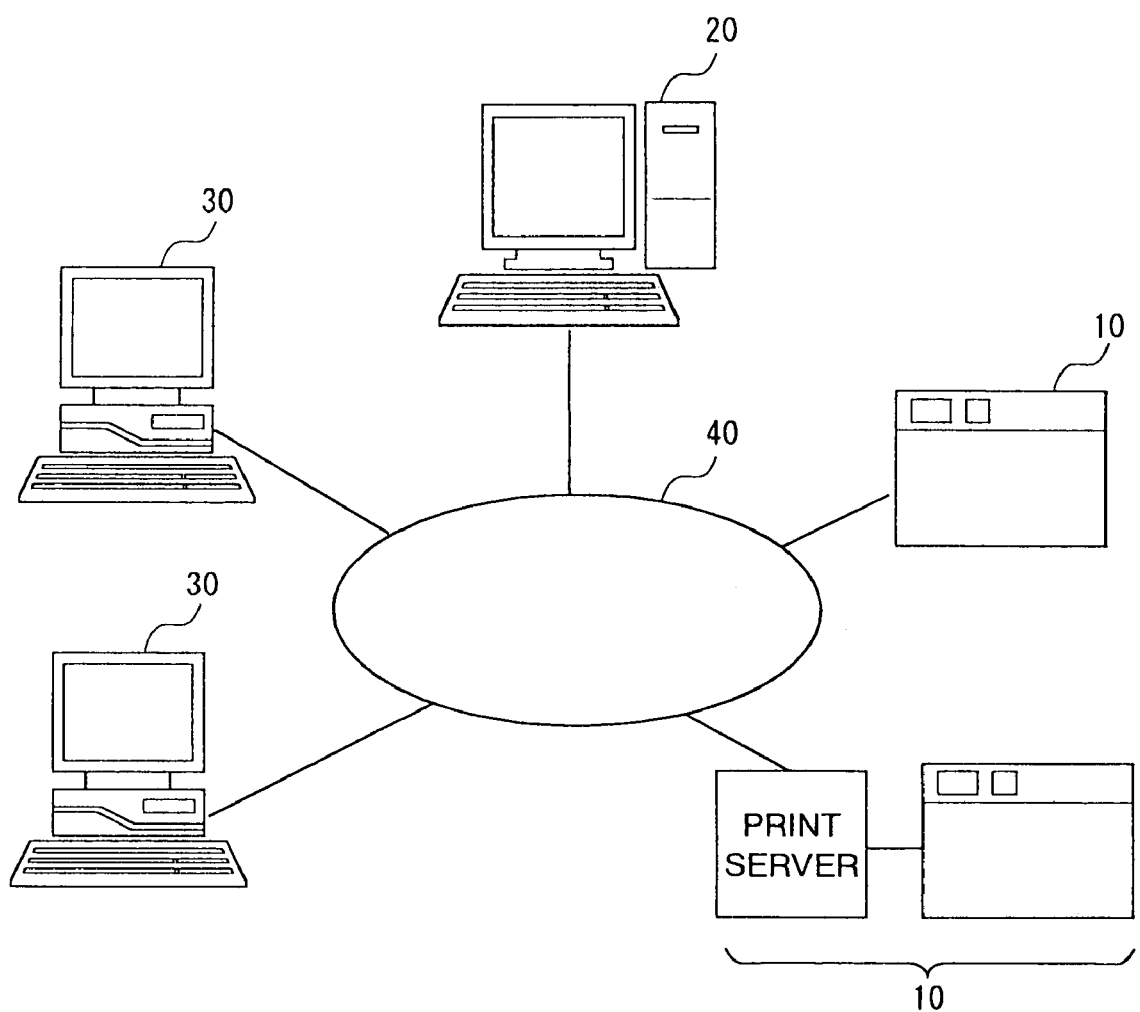
FIG. 1 is a schematic view showing a configuration of a device management network system according to an embodiment of the present invention.

As shown in FIG. 1, the device management network system of the embodiment consists of a plurality of printing devices 10 which are network devices to be managed, one management server 20, a plurality of client devices 30 each having a Web browser supporting Java, and a communication medium 40 (in this embodiment, the medium corresponds to LAN cables) through which these network components communicate with each other. The printing devices 10 in this device management network system are embodied in network printers and devices each constructed of a print server and more than one local printer.

This device management network system is a network system which enables a user (a network administrator) to grasp all abnormalities that has occurred in any printing device 10 with his client device 30.

When a user wants to monitor the operation status of a certain printing device 10, the user activates the Web browser in his client device 30 to display a device management top page, which resides on the management server 20. Then, by clicking on a particular hyperlink in the device management top page, the user causes the Web browser to display a device list page. The device list page is a Web page including device icons and device descriptions (model names, MAC addresses, IP addresses, etc.) for respective printing devices 10.

When the user clicks on a device icon for a certain printer device in the device list page, various kinds of information exchange occur between the client device 30 running the Web browser and the management server 20 and between the management server 20 and the printing device 10 corresponding to the clicked device icon (referred to as "selected printing device" thereafter). As a result, a device-details page including a device-details screen that represents the operating status of the selected printing device 10 is displayed on the display of the client device 30.

Figure 2:
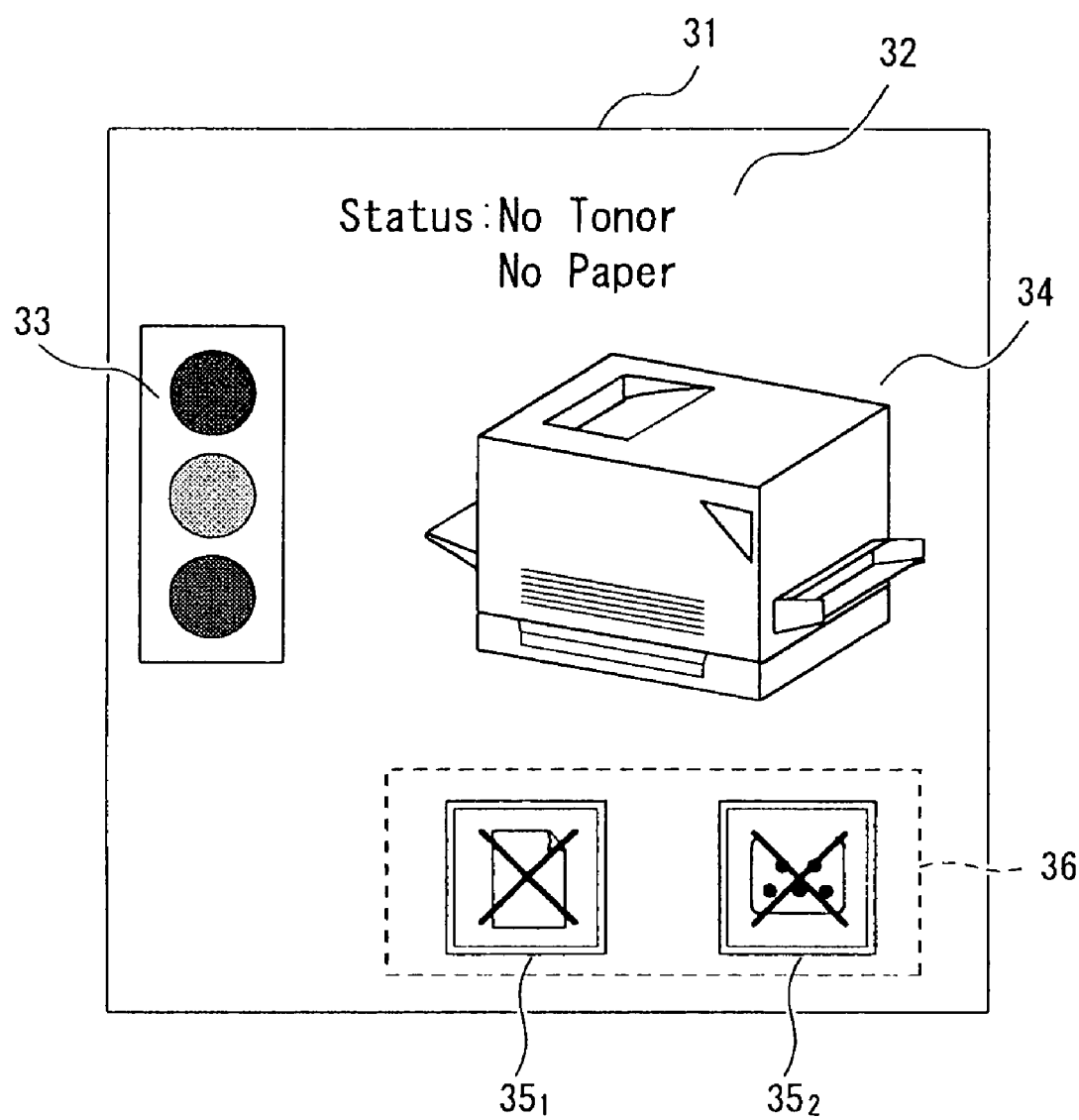
FIG. 2 is a figure illustrating a device-details screen displayed at a client device in the device management network system according to the embodiment.

FIG. 2 shows an example of the device-details screen included in the device-details page in the case where two abnormalities have occurred in the selected printing device 10. As shown in the figure, the device-details screen 31 in this case includes four pieces of information (two status description strings 32, and error images $35_1$ and $35_2$) each of which indicates abnormality has occurred in the selected printing device 10, a status level image 33, which indicates the severity of the malfunction of the specified printing device 10, and a printer image 34, which shows the external appearance of the selected printing device 10 or of a representative printing device in the category to which the selected printer device 10 belongs. Note that, in the case where the selected printing device 10 operates normally, displayed is the device-detail page with the device-details screen 31 which includes "States: Normal Operation" as the status description string 32 and no error image within an area 36 defined by the dotted lines.

The configuration and operation of the device management network system of the present embodiment will be discussed specifically below.

Figure 3:
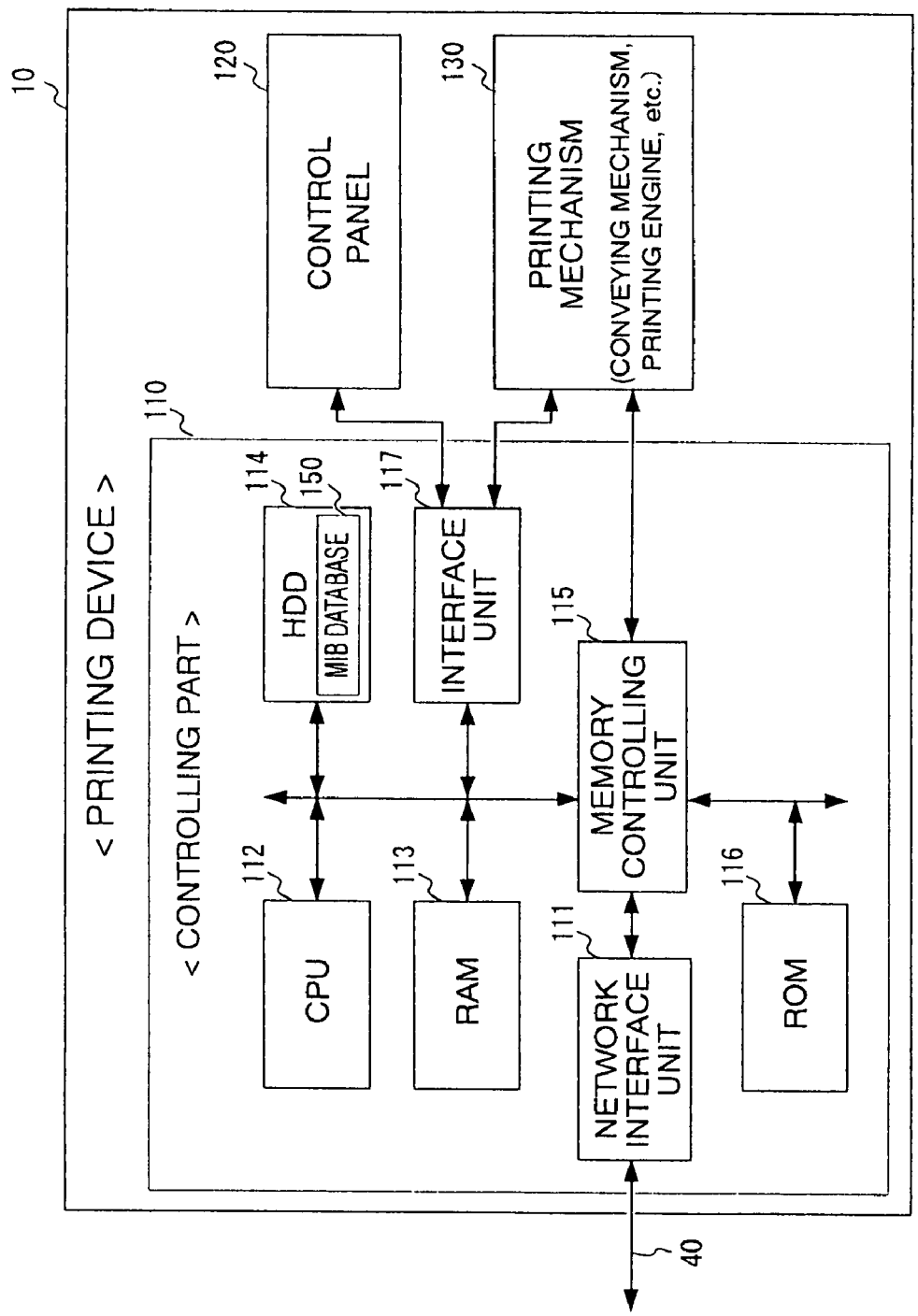
FIG. 3 is a schematic view showing a hardware construction of a printing device in the device management network system according to the embodiment.

As shown in FIG. 3, the printing device 10 in the present device management network system is equipped with a controlling part 110, a control panel 120, and a printing mechanism 130. The printing mechanism 130 is a mechanism that actually executes printing operations on paper. The printing mechanism 130 is constructed of a paper feeding unit, a paper conveying mechanism, and a printing engine, etc. The control panel 120 is an interface between the printing device 10 and a user. The control panel 120 is constructed of a plurality of buttons for selecting operation of the printing device 10, a liquid crystal display panel and several LEDs for displaying operation status.

The controlling part 110 consists of a network interface unit 111, a CPU 112, a RAM 113, an HDD 114 (hard disk drive), a memory controlling unit 115, a ROM 116, and an interface unit 117. The interface unit 117 is connected to the control panel 120 and the printing mechanism 130, and the memory controlling unit 115 is connected to the printing mechanism 130.

The ROM 116 is a memory stored with programs and data used by the programs. The CPU 112 is a control unit that controls each part of the controlling part 110 in accordance with the programs stored in the ROM 116. The network interface unit 111 is a unit utilized by the CPU 112 for communicating with other devices (management server 20, client device 30) through the communication medium 40.

The RAM 113 is a memory for temporarily storing various data, such as printing data received by the network interface unit 111 and intermediate codes generated based upon the printing data. The HDD 114 is an auxiliary storage which stores an MIB (Management Information Base) database 150. The MIB database 150 is a database that contains MIB objects (such as hrDeviceStatus, prtMakerTech) which are defined by RFC1514 (Host resource MIB) and RFC1759 (Printer MIB), and so on.

The memory controlling unit 115 is a unit that conducts various processes, such as transferring data from the network interface unit 111 to the RAM 113 (or HDD 114 in some cases), and transferring data from the RAM 113 to the printing engine in the printing mechanism 130. The interface unit 117 is constructed of a plurality of interface circuits for use in information exchange between the CPU 112 and the control panel 120 and between the CPU 112 and the printing mechanism 130. The CPU 112 executing the programs in the ROM 116 monitors the operation status of the printing mechanism 130 through this interface unit 117.

Hereinafter, the operation of the printing device 10 is explained.

Figure 4:
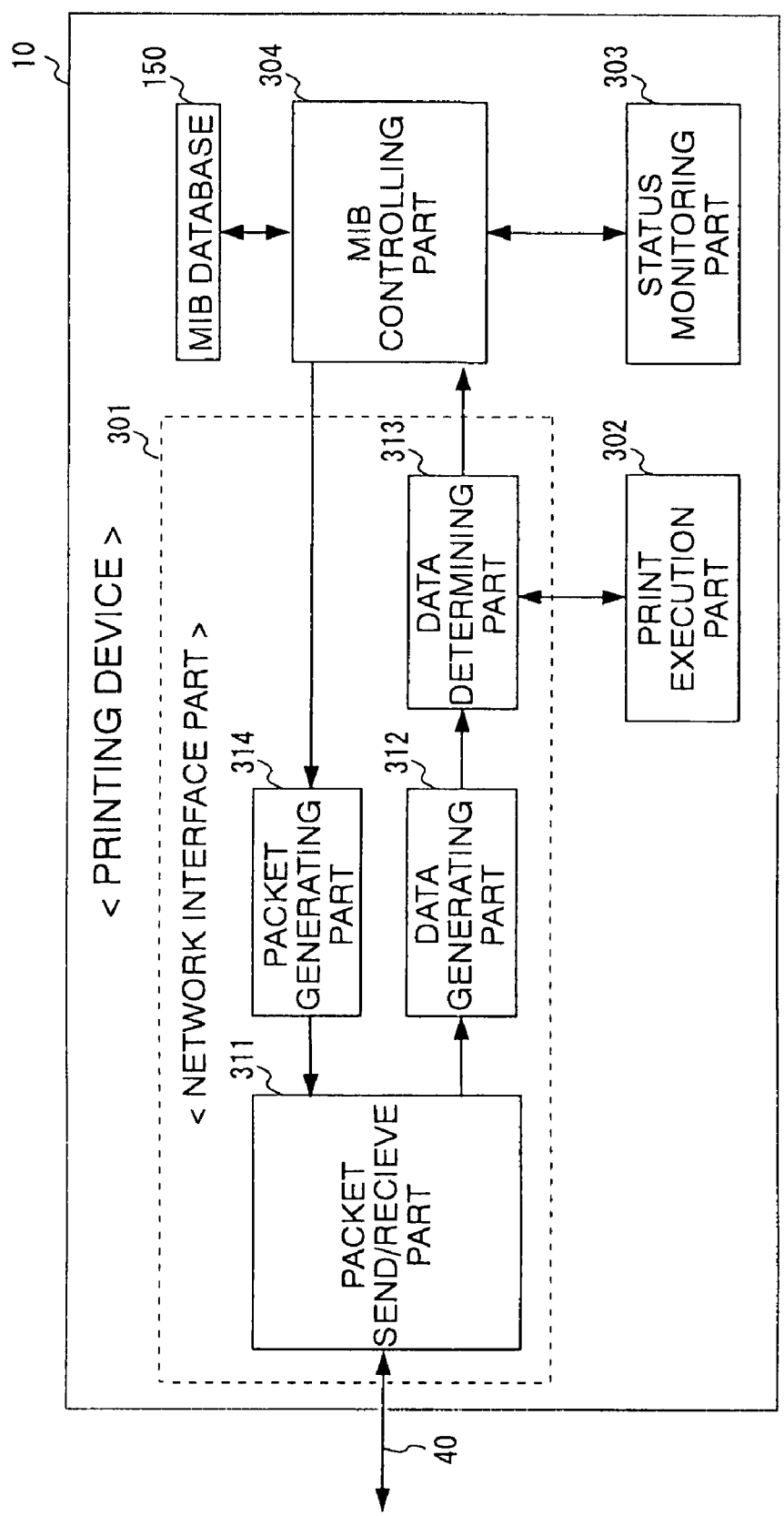
FIG. 4 is a functional block diagram of the printing device.

As shown in FIG. 4, the printing device 10 operates as a device that consists of a network interface part 301, a printing execution part 302, a status monitoring part 303, an MIB controlling part 304, and the MIB database 150. Here, the network interface unit 111 of FIG. 3 operates as the network interface part 301, and the other parts of the printing device 10 excluding the network interface unit 111 operate as the printing execution part 302 and the status monitoring part 303. The CPU 112 also operates as the MIB controlling part 304.

The network interface part 301 consists of a packet send/receive part 311, a data generating part 312, a data determining part 313, and a packet generating part 314. The packet generating part 314 generates a UDP packet (an SNMP message) for the management server 20 based on the data from the MIB controlling part 304, and supplies the packet to the packet send/receive part 311. The packet send/receive part 311 sends the packet received from the packet generating part 314 to the management server 20 through the communication medium 40. The packet send/receive part 311 also receives packet(s) from other devices through the communication medium 40 and passes the received packet(s) to the data generating part 312. The data generating part 312 deassembles one or more packets received from the packet send/receive part 311 into original data, and feeds the data to the data determining part 313.

The data determining part 313 determines whether the data fed from the data generating part 312 is a printing data or an SNMP message. When determining the data is a printing data, the data determining part 313 passes the data (printing data) to the printing execution part 302. When determining the data is an SNMP message, the data determining part 313 passes the data (SNMP message) to the MIB controlling part 304.

Summarizing, the network interface part 301 supplies the printing execution part 302 with the received-printing data, and supplies the MIB controlling part 304 with the received SNMP messages. Also, the network interface part 301 generates SNMP messages based on the data supplied from the MIB controlling part 304 and sends them to the management server 20.

The printing execution part 302 performs actual printing operation on paper based on the printing data supplied from the network interface part 301. The status monitoring part 303 monitors the operation status of each part of the printing device 10 (mainly the operation status of the printing execution part 302), and informs the monitoring results to the MIB controlling part 304.

The MIB controlling part 304 holds a community name, an IP address of the management server 20 to which SNMP trap messages will be sent, and so on. These data are set into the MIB controlling part 304 in a manner similar to that of general SNMP based systems.

The MIB controlling part 304 rewrites the content of the MIB database 150 in accordance with the monitoring results of the status monitoring part 303. When accepting an SNMP message with a valid community name (an SNMP message from the management server 20) from the network interface part 301, the MIB controlling part 304 operates according to the SNMP message. For example, if the SNMP message is a "GET-Request" message or a "GET-Next-Request" message, the MIB controlling part 304 retrieves a value corresponding the SNMP message from the MIB database 150, and then controls the network interface part 301 so as to return a "GET Response" message containing the retrieved value to the management server 20.

Figure 5:
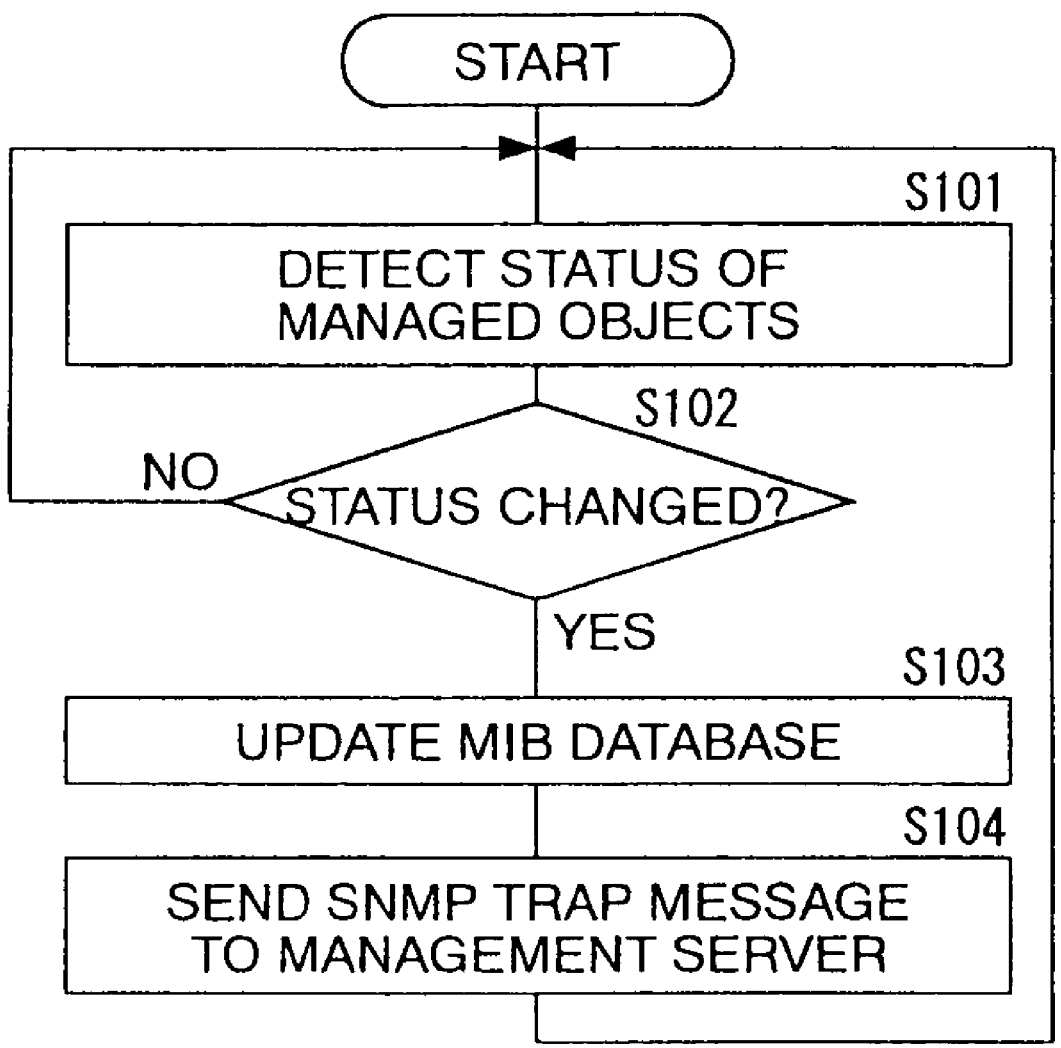
FIG. 5 is a flow chart showing an operation procedure of an MIB controlling part in the printing device.

Furthermore, when any change of the operation status is detected by the status monitoring part 303, the MIB controlling part 304 sends to the management server 20 an SNMP trap message indicating that a change of the status has just occurred. That is, as shown in FIG. 5, the MIB controlling part 304 is monitoring, through the status monitoring part 303, the status of managed objects in the printing device 10 (step S101 and step S102 with NO). When detecting a change of the operation status (step S102 with YES), the MIB controlling part 304 updates the content of the MIB database 150 (step S103). Next, by controlling the network interface part 301, the MIB controlling part 304 sends the SNMP trap message that informs the management server 20 about the occurrence of the status change (step S104), and then returns to step S101.

Note that, in the printing device 10 that is constituted of a print server and a local printer, the print server conducts the MIB related processes described above. Namely, a CPU within the print server retrieves the printer status information from the printer, and executes the processes shown in FIG. 5.

Next, the hardware configuration of the management server 20 will be described.

Figure 6:
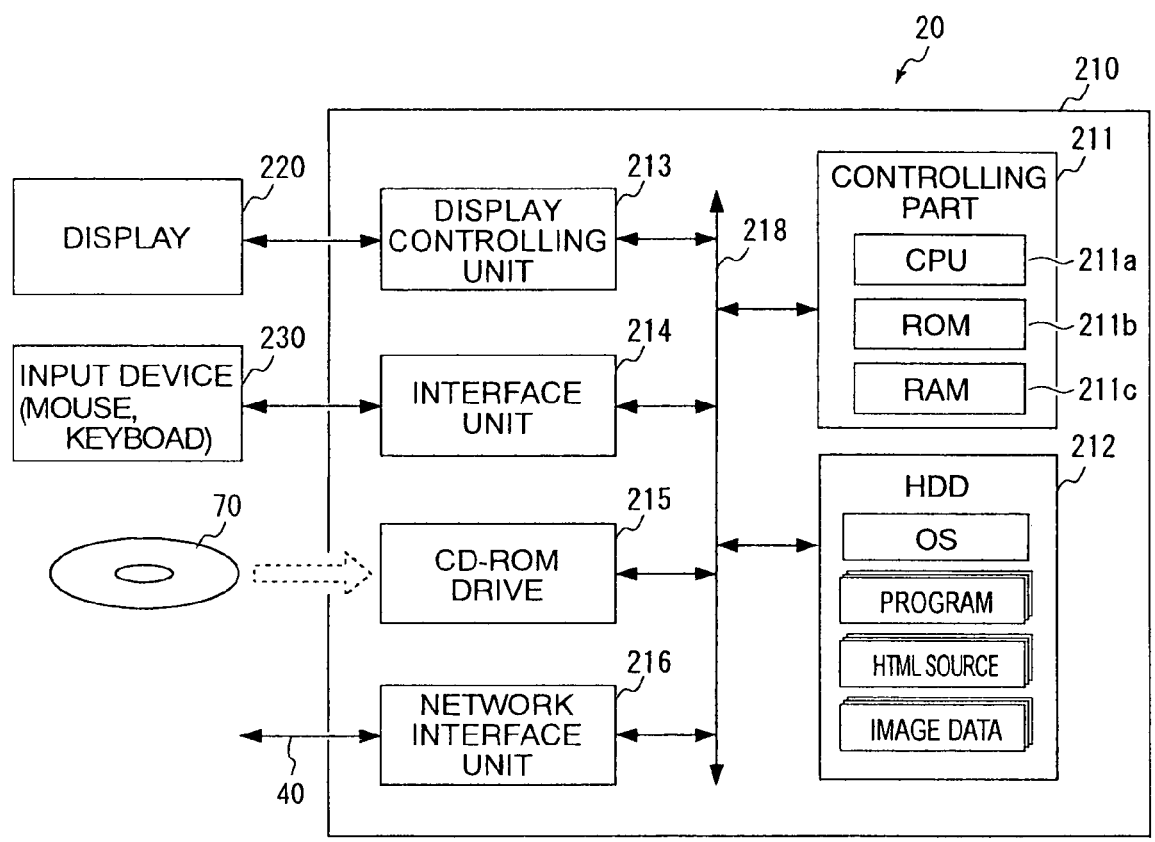
FIG. 6 is a schematic view showing a hardware construction of a management server in the device management network system according to the embodiment.

As shown in FIG. 6, the management server 20 is equipped with a main body 210, a display 220, and an input device 230. The main body 210 includes a controlling part 211, an HDD 212, a display controlling unit 213, an interface unit 214, a CD-ROM drive 215, and a network interface unit 216, which are mutually connected by a bus 218.

The controlling unit 211 is a unit that controls each part of the management server 20, and is constructed of a CPU 211a, a ROM 211b, and a RAM 211c, etc. The display controlling unit 213 is a unit utilized by a controlling part 211 in order to display images on the display 220. The input device 230 is a device used by a system administrator in order to provide the management server 20 (controlling part 211) with various kinds of instructions, and is constructed of a mouse and a keyboard, etc. The network interface unit 216 is a unit used by the controlling part 211 when communications with other devices are required.

The HDD 212 is an auxiliary storage that stores the OS (Windows 95/98/NT in this embodiment) and various programs developed for this system. Further, this HDD 212 stores Java applet files, HTML document files, image files for the device-details screen 31, and so on, which are utilized by the controlling part 211 in accordance with these programs.

The CD-ROM drive 215 is a reading device for a CD-ROM 70. The installation of various kinds of software on the HDD 212 is achieved either through the CD-ROM 70 using this CD-ROM drive 215, or from auxiliary storage of other devices using network interface unit 216.

That is, the management server 20 is constructed by installing programs and data developed for use in the present system onto an ordinary computer. Each client device 30, which is to be included in the present system, may also be a device that is not significantly different from ordinary computers in terms of software and hardware. Thus, the explanation of configuration thereof is omitted.

Next, the operation of the management server 20 is described.

Figure 7:
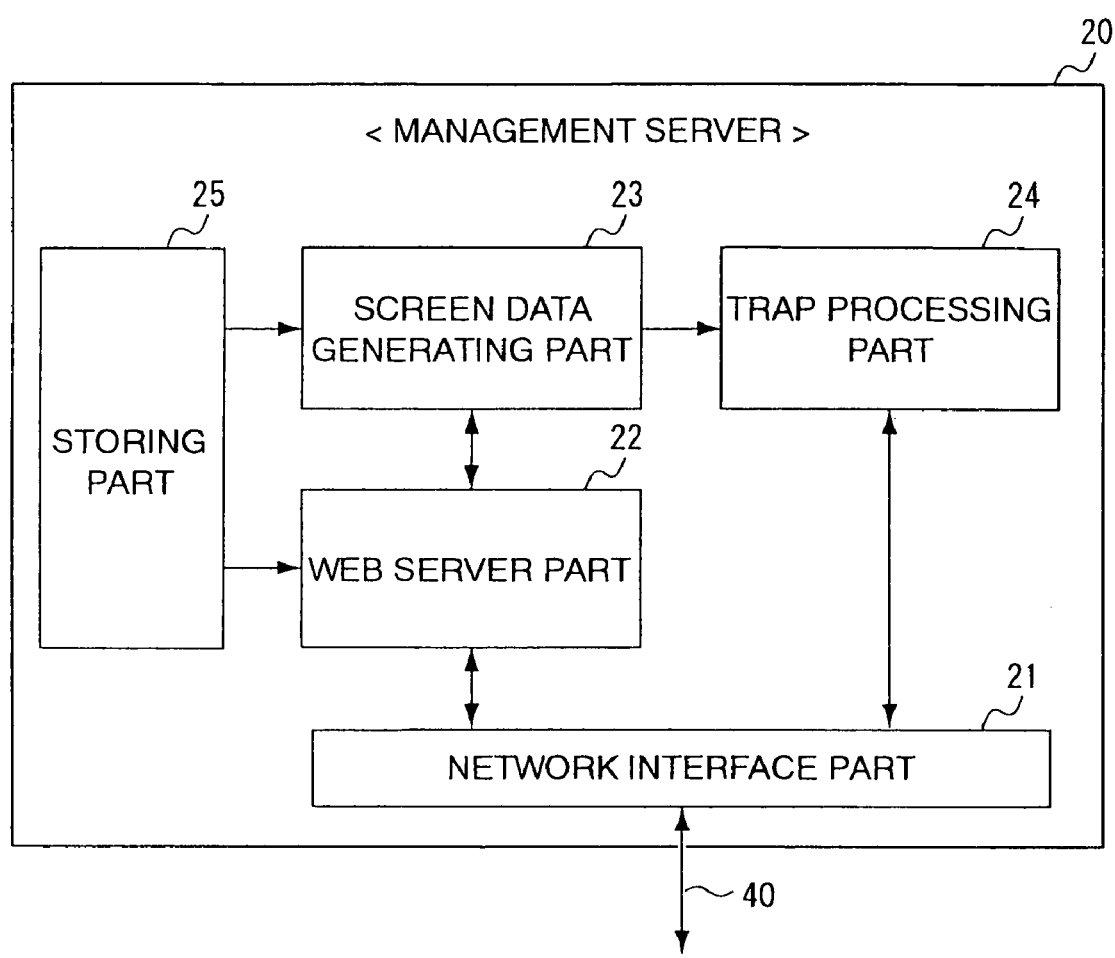
FIG. 7 is a functional block diagram of the management server.

With the controlling part 211 operating in accordance with various kinds of programs, as shown in FIG. 7, the management server 20 operates as a device having a network interface part 21, a Web server part 22, a screen data generating part 23, a trap processing part 24, and a storing part 25. Here, the network interface unit 216 of FIG. 6 operates as the network interface part 21. The controlling part 211 operates as the Web server part 22, the screen data generating part 23, and the trap processing part 24. The HDD 212 operates as the storing part 25.

The network interface part 21 deassembles one or more packets received from other devices through the communication medium 40 into original data. The network interface part 21 then supplies the data to the Web server part 22 or trap processing part 24 depending on the protocol number and the port number included in the packets. More specifically, the network interface part 21 supplies HTTP (Hypertext Transfer Protocol) requests and SNMP messages excluding SNMP trap messages to the Web server part 22, and supplies SNMP trap messages to the trap processing part 24. Also, the network interface part 21 assembles one or more packets from data supplied from the Web server part 22 or from the trap processing part 24, and transmits the packets to their destination.

The storing part 25 stores image data files, Java applet class files, and HTML document files, etc., which are used by the Web server part 22 and by the screen data generating part 23.

As for image data files, the storing part 25, as schematically shown in FIG. 8, stores files of status level images 33a through 33e each corresponding to a value of prtAlertSeverityLevel and a value of prtAlertTrainingLevel. Also, as shown in FIG. 9, the storing part 25 stores files of printer images 34a through 34c each corresponding to a value of prtMakerTech. Furthermore, the storing part 25 stores files of printer images of several specific printing devices corresponding to the values of hrDeviceDescr. In addition, as schematically shown in FIG. 10, the storing part 25 stores files of error images 35a through 35f corresponding to the values of hrDevicesStatus, hrPrinterStatus, and hrPrinterDetectedErrorState.

The Web server part 22 (see FIG. 7) processes HTTP requests from the client devices 30. For example, when receiving a request for a file in the storing part 25, the Web server part 22 reads out the corresponding file from the storing part 25. Then, the Web server part 22 attaches a header to the file, and returns it to the client device 30 that has sent the request. When receiving a request of a specific type, the Web server part 22 passes the request to the screen data generating part 23. Then, the Web server part 22 attaches a header to data that are returned by the screen data generating part 23 in response to the request, and returns it to the client device 30 that has sent the request.

Concretely, the Web server part 22 passed a device-details screen request, a screen data request, a notification committing request, and a termination notifying message to the screen data generating part 23.

The device-details screen request is a request containing identification information of the selected printing device 10 (in this embodiment, the identification information is the IP address of the selected printing device 10). The client device 30 displaying the device list page sends this device-details screen request when detecting clicking on a device icon. In other words, the device list page supplied from the management server 20 to the client device 30 is an HTML document, which caused the client device 30 to conduct such operations.

When receiving the device-details screen request, the screen data generating part 23 generates, based on an HTML document sample and the identification information in the request, an HTML data for the device-details page, which instructs the Web browser to download and execute a displaying applet and a notifying applet. Then, the data generating part 23 returns the generated HTML data to the client device 30 that has sent the device-details screen request through the Web server part 22 and the network interface part 21.

The displaying applet is an applet for causing the client device 30 running the Web browser to send a screen data request containing the identification information of the selected printing device 10 to the management server 20, and to display the device-details screen 31 based upon screen data which is sent from the management server 20 in response to the screen data request.

Figure 11:
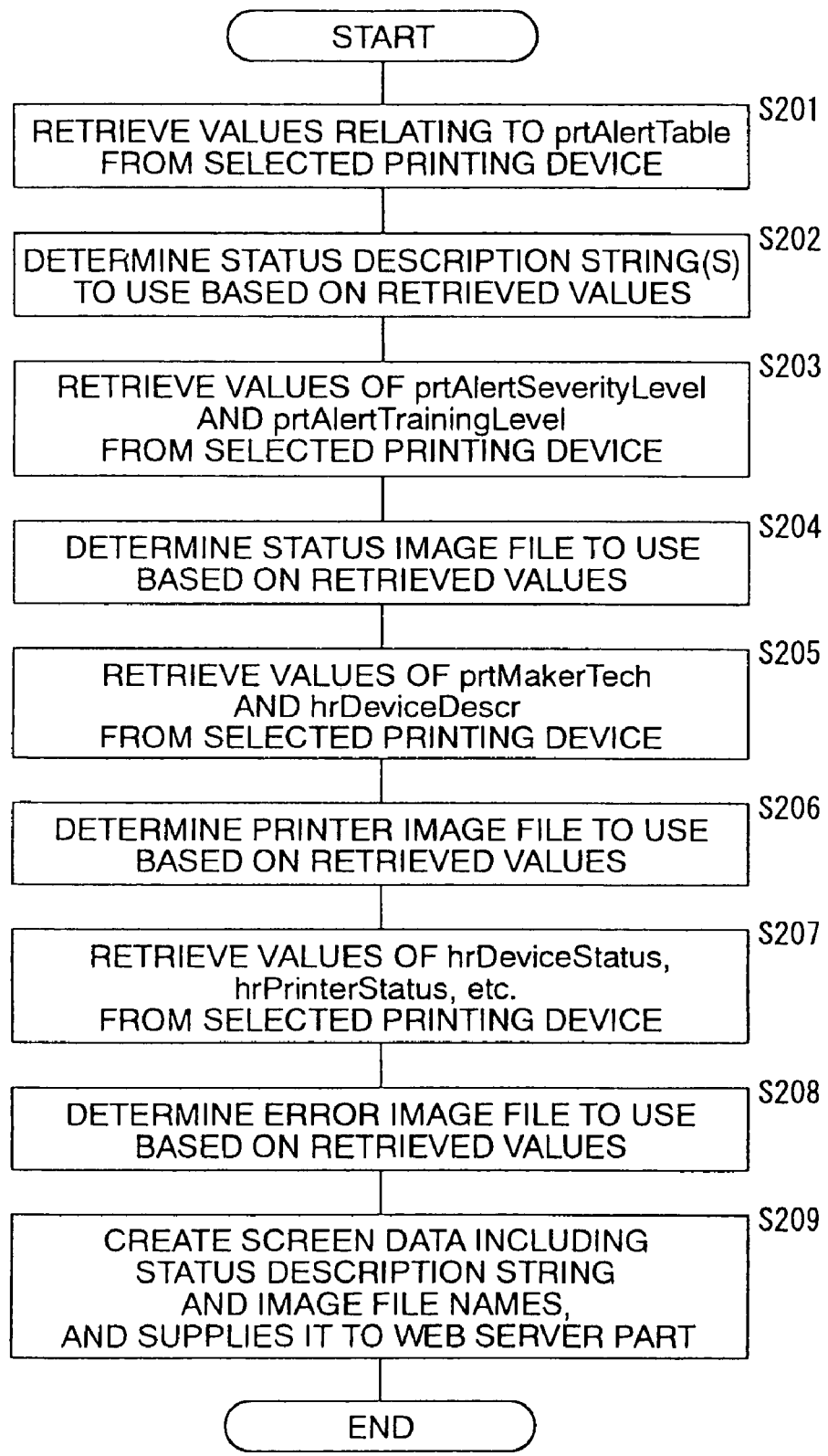
FIG. 11 is a flow chart showing a response procedure by a screen data generating part in the management server in responding to a screen data request.

As shown in FIG. 11, when receiving the screen data request, the screen data generating part 23 in the management server 20 retrieves values relating to prtAlertTable from the MIB database 150 of the selected printing device 10 (the printing device 10 corresponding to the identification information contained in the screen data request) by controlling the network interface part 21 (step S201). Then, based on the retrieved values, the screen data generating part 23 determines at least one status description string to embed in the device-details screen 31 (step S202).

More specifically, at step S201, the screen data generating part 23 retrieves every value of prtAlertCode under each prtAlertGroup from the MIB database 150 of the selected printing device 10. Then, at step S202, the screen data generating part 23 specifies status description string(s) corresponding to the retrieved value(s) in a status description string table, and determines specified status description string(s) to embed in the device-details screen 31. The status description string table is, as shown in FIG. 12, a table holding status description strings corresponding each value of prtAlertCode under each prtAlertGroup, which may be found in the MIB database 150 of the printing device 10.

In the case where prtAlertTable of the MIB database 150 of the selected printing device 10 is found to be empty at step S201, the screen data generating part 23 checks the value of the offline bit of hrPrinterDetectedErrorState. Then, at step S202, if the offline bit is set, the screen data generating-part 23 determine the status description string "Status: Offline" to use in the device-details screen 31. If the offline bit is not set, the screen data generating part 23 determine the status description string "Status: Normal Operation" to use in the device-details screen 31.

After determining one or more status description strings for the device-details screen 31 in a manner described above, the screen data generating part 23 retrieves the values of prtAlertSeverityLevel and prtAlertTrainingLevel from the MIB database 150 of the selected printing device 10 (step S203). Then, based on the retrieved values, the screen data generating part 23 determines the status level image file to embed in the device-details screen 31 (step S204).

In this step S204, in the case that the value of prtAlertSeverityLevel is "other", "warning" or "communication error", the screen data generating part 23 determines the image file of the status level image 33a, 33b, or 33e (see FIG. 8) to embed in the device-details screen 31, respectively. When the prtAlertSeverityLevel value is "critical" and the prtAlertTrainingLevel value is "fieldservice", the screen data generating part 23 determines to use the image file of the status level image 33d. When the prtAlertSeverityLevel value is "critical" and the prtAlertTrainingLevel value is not "fieldservice", the screen data generating part 23 determines to use the image file of the status level image 33c.

After determining the status level image file for the device-details screen 31, the screen data generating part 23 retrieves the values of prtMakerTech and hrDeviceDescr from the MIB database 150 of the selected printing device 10 (step S205). Then, based upon on the retrieved values, the screen data generating part 23 determines a printer image file to embed in the device-details screen 31 (step S206).

In this step S206, the screen data generating part 23, first, judges whether a printer image file corresponding to the retrieved hrDeviceDescr value exists in the storing part 25. Then, if such printer image file exists, the screen data generating part 23 determines the printer image file to embed in the device-details screen 31. On the other hands, if such printer image file does not exit, the screen data generating part 23 determines to use a printer image file for one of the generic printer images 34a through 34c in accordance with the prtMakerTech value (see FIG. 9).

After determining the printer image file for the device details screen 31, the screen data generating part 23 retrieves values of hrDeviceStatus, hrPrinterStatus, and hrPrinterDetectedErrorState from the MIB database 150 of the selected printing device 10 (step S207). Then, based on the retrieved values, the screen data generating part 23 selects, from the files of error images 35a to 35f (see FIG. 10), one or more of error image files to embed in the device-details screen 31 (step S208). Note that, when hrPrinterDetectedErrorState is "noToner," the screen data generating part 23 determines whether to use a file of an error image 35c for "No Toner", or a file of an error image 35d for "No Ink" based on the prtMakerTech value that has been retrieved.

Then, the screen data generating part 23 generates screen data including the determined status description string and the file names of each of the determined image files, and returns the screen data to the Web server 22 as a response to the screen data request (step S209).

The screen data is returned to the client device 30 that originally outputted the screen data request by the Web server part 22 and the network interface part 21. The client device 30 (displaying applet) receiving the screen data displays the status description string included in this screen data, and sends requests for the files, names of which are included in the screen data. Then, the client device 30, by displaying image data sent from the Web server part 22 in response to each request, complete the displaying of the device-details screen 31 (see FIG. 2).

Figure 13:
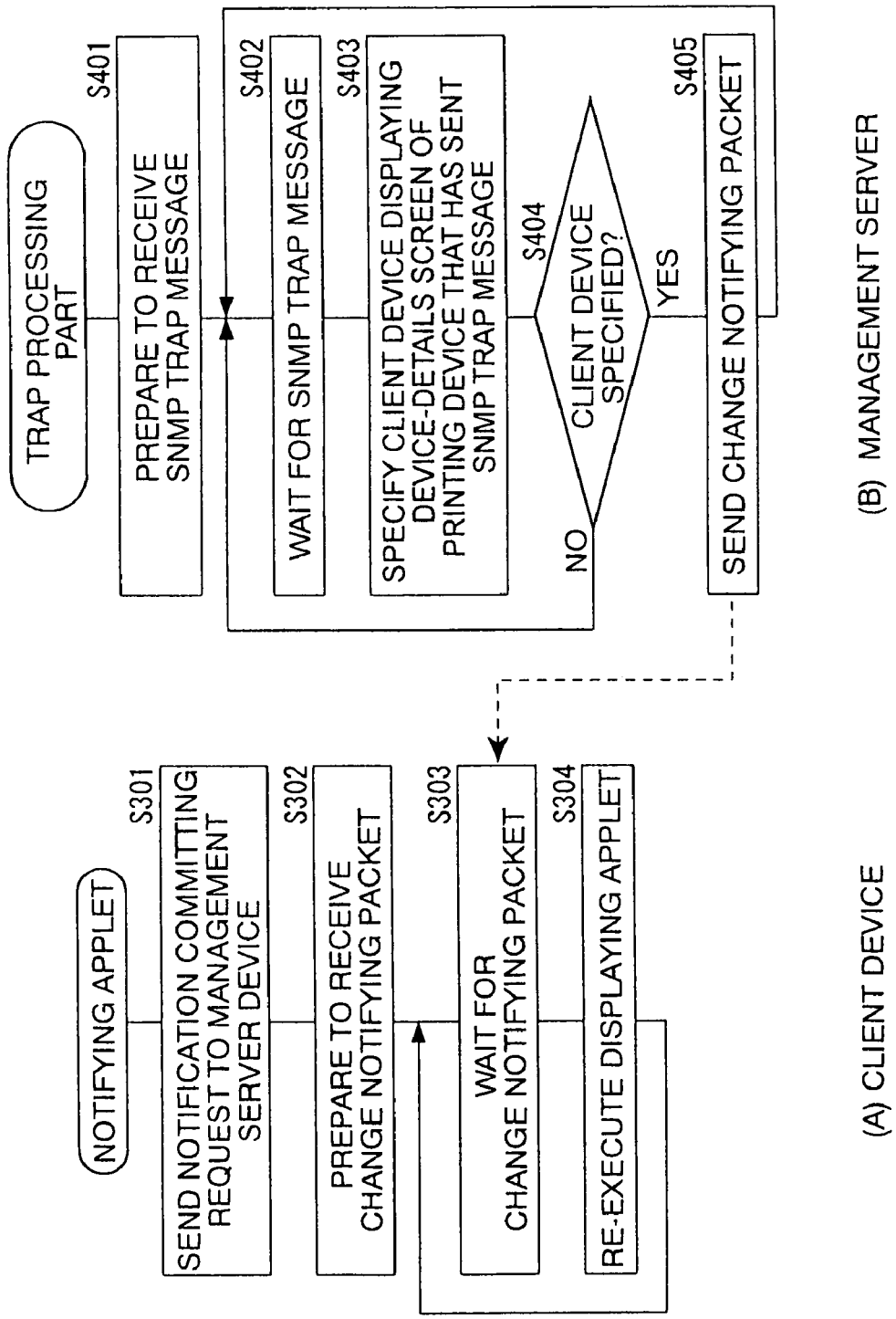
FIGS. 13(A) and 13(B) are flowcharts describing a procedure for redisplaying a device-details screen in the device management network system according to the embodiment.

Hereinafter, the operation of the client device 30 and management server 20 relating to the notifying applet will be described with reference to FIG. 13.

The notifying applet is an applet that is executed concurrently with the displaying applet when the device-details page is displayed at a client device 30.

As shown in FIG. 13(A), the client device 30, in which the notifying applet is executed, first transmits to the management server 20 a notification committing request (step S301). The notification committing request is an HTTP request including the IP address of the client device 30; a port number which is to be used for receiving a change notifying packet; and the IP address of the selected printing device 10. The notification committing request is passed to the trap processing part 24 through the Web server part 22, and processed by the trap processing part 24. A detail of the process is discussed later.

After transmitting the notification committing request, the client device 30 prepares for receiving a change notifying packet, which is a UDP packet that the management server 20 sends (step S302), and waits for the change notifying packet (step S303). Upon receiving the status change notifying packet, the client device 30 re-executes the displaying applet (step S304), and then returns to step S303.

On the other hand, as shown in FIG. 13(B), the trap processing part 24 in the management server 20, when launched, prepares for receiving SNMP trap messages from the printing device 10 (step S401). Then, the trap processing part 24 waits for SNMP trap messages (step S402).

Although omitted in the FIG. 13(B), the trap processing part 24 also waits for the notification committing request. Upon receiving the notification committing request, the trap processing part 24 stores the contents of the notification committing request (two IP addresses and a port number) in a usage situation information table.

When receiving an SNMP trap message indicating that the operation status has just changed from a printing device 10, the trap processing part 24 specifies every client device 30 displaying the device-details screen 31 of the printing device 10 that has sent out the SNMP trap message based upon information in the usage situation information table (step S403).

In the case that one or more client devices 30 displaying the device-details screen 31 of the printing device 10 that have sent the SNMP trap message are specified (step S404: YES), the trap processing part 24 sends, to each specified client device 30, a change notifying packet with a destination port number specified by the notification committing request that the client device 10 has sent, based on the information in the usage status information table (step S405). Then, the trap processing part 24 returns to step S402.

On the other hand, in the case that the client device 30 displaying the device-details screen 31 of the printing device 10 that has sent the SNMP trap message is not specified (step S404: NO), the trap processing part 24 returns to step S402 without sending a change notifying packet.

Note that, the client device 10 displaying the device-details page and the management server 20 also operate as follows.

When the device-details page is closed, the notifying applet causes the client device 30 to send a termination notifying message. The termination notifying message is an HTTP message, which contains the IP address of the client device 30, and the IP address of the selected printing device 10. The termination notifying message is passed to the trap processing part 24 through the screen data generating part 23. When receiving the termination notifying message, the trap processing part 24 deletes information relating to the IP addresses in the message from the usage situation information table.

In addition, after transmitting the change notifying packet, the trap processing-part 24 waits for an ACK-packet from the client device 10. If no ACK packet is transmitted during a-predetermined time period, the trap processing part 24 retransmits the change notifying packet. If no ACK packet is returned even after the change notifying packets are re-sent for a predetermined number of times, the trap processing part 24 determines that display of the device-details screen 31 is terminated, and deletes information relating to the corresponding client device 30 and printing device 10 from the usage situation information table.

As described above, in the present device management network system, management server 20 receiving a device-details screen request from a certain client device 30 collects MIB objects from the printing device 10 specified by the information (IP address) in the device-details screen request. Then, the management server 20 provides the client device 30 with data which causes the Web browser to display the device-details screen 31 containing information about all abnormalities that has occurred in the printing device 10.

Thus, according to the device management network system, all abnormalities that have occurred in any printing device 10 can be monitored by a Web browser.

Note that, in the device management network system of this embodiment, the displaying applet and the notifying applet are used to display the device-details screen 31, because this configuration enables real-time monitoring of printing device 10 without degrading network performance. Consequently, if real-time monitoring is not required, it is possible to configure the management server 10 so as to create, when receiving the device-details screen request, an HTML document that has no applet tag and causes the Web browser to display device-details screen 31.

In the device management network system described above, printing devices 10 are used as an example of network devices to be managed. However, it is apparent that the network devices to be managed may be devices other than printers. Further, communications among printing devices 10 (network devices to be managed) and the management server 20 may be communicated using a unique or different protocol instead of the SNMP. Further, by installing a Web browser into the management server 20, it is possible to modify the device management network system into a network system in which the operation status of the printing devices 10 can be monitored with the management server 20.

While there has been described what are at present considered to be preferred embodiment of the present invention, it will be understood that various modifications may be made thereto, and it is intended that the appended claims cover all such modifications as fall within the true spirit and scope of the invention.

What is claimed is:

1. A device management network system including a management server, one or more network devices to be managed, and one or more client devices, each of said one or more network devices comprising:
a status information storing part for storing status information;

a monitoring part for monitoring predetermined parts to determine whether each of the predetermined parts is functioning properly, and updating the status information stored in said status information storing part so as to include information about all abnormalities that have occurred in the predetermined parts based on monitoring results; and a request responding part for, when receiving a status information request from said management server, sending the status information stored in said status information storing part to said management server, and said management server comprising:
a status information obtaining part for, when receiving a device-details screen request containing identification information of a network device among said one or more network devices from a client device running a Web browser, obtaining status information stored in said status information storing part of the network device identified by the identification information in the device-details screen request by sending the status information request to the network device;

a specifying part for specifying all abnormalities that has occurred in the network device identified by the identification information in the device-details screen request based on the status information obtained by said information obtaining part; and an information sending part for sending information indicating all abnormalities specified by said specifying part to the client device that has sent the device-details screen request, wherein said information sending part of said management server sends information containing names of image files associating with the abnormalities specified by said specifying part.

2. The device management network system according to claim 1, wherein the status information in said status information storing part of a network device contains type information of the network device, and wherein said management server further comprises:
an image storing part for storing a plurality of image files, each of which corresponds to a type information and holds image data representing outside appearance of a network device related to the corresponding type information; and an image sending part for selecting from the plurality of image files stored in said image storing part an image file corresponding to the type information in the status information obtained by said status information obtaining part, and sending data in the selected image file to the client device that has sent the device-details screen request.

3. The device management network system according to claim 1, wherein said management server further has functions of said client device.

4. The device management network system according to claim 1, wherein each of said one or more network devices is a network printer.

5. A management server to be attached to a network including one or more network devices to be managed, and one or more client devices having a Web browser, the management server comprising:

a status information obtaining part for, when receiving a device-details screen request containing identification information of a network device among said one or more network devices from a client device running a Web browser, obtaining status information from the network device identified by the identification information in the device-details screen request;

a specifying part for specifying all abnormalities that has occurred in the network device identified by the identification information in the device-details screen request based on the status information obtained by said information obtaining part; and an information sending part for sending information indicating all abnormalities specified by said specifying part to the client device that has sent the device-details screen request, wherein said information sending part sends information including names of image files associating with the abnormalities specified by said specifying part.

6. The management server according to claim 5, wherein the status information that is sent from a network device contains type information indicating a type of the network device, and wherein said management server further comprises:

an image data storing part for storing a plurality of image data each of which representing outside appearance of a network device, and an image data sending part for selecting from the plurality of image data an image data corresponding to the network device specified by the identification information in the status information obtained by said status information obtaining part, and for sending the image data to the client device that has sent the device-details screen request.

7. A computer readable medium stored with a program for causing a computer to function as a management server to be attached to a network including one or more network devices to be managed, and one or more client devices having a Web browser, the management server comprising:

a status information obtaining part for, when receiving a device-details screen request containing identification information of a network device among said one or more network devices from a client device running a Web browser, obtaining status information from the network device identified by the identification information in the device-details screen request;

a specifying part for specifying all abnormalities that has occurred in the network device identified by the identification information in the device-details screen request based on the status information obtained by said information obtaining part; and an information sending part for sending information indicating all abnormalities specified by said specifying part to the client device that has sent the device-details screen request, wherein said information sending part sends information including names of image files associating with the abnormalities specified by said specifying part.

8. The computer readable medium according to claim 7, wherein the status information that is sent from a network device contains type information indicating a type of the network device, and wherein said management server further comprises:

an image data storing part for storing a plurality of image data each of which representing outside appearance of a network device; and an image data sending part for selecting from the plurality of image data an image data corresponding to the network device specified by the identification information in the status information obtained by said status information obtaining part, and for sending the image data to the client device that has sent the device-details screen request.

9. A device management network system method including a management server, one or more network devices to be managed, and one or more client devices, the method comprising:

sending a device-details screen request from a client device to a management server, the device-details screen request containing identification information of a network device;

obtaining status information from a network device identified by the identification information in the device-details screen request by communication between the management server and the network device;

specifying all abnormalities that has occurred in the network device identified by the identification information in the device-details screen request based on the status information obtained from the network device; and sending the information indicating all abnormalities from the management server to the client device, wherein the information indicating all abnormalities was specified by the network device to the management server, wherein said information indicating all abnormalities includes names of image files associating with the abnormalities that were specified.

10. The device management network system method of claim 9, further comprising:

storing a plurality of image data in the management server, each of which represents an outside appearance of the network devices; and selecting from the plurality of image data an image data corresponding to the network device specified by the identification information; and sending the image data from the management server to the client device that has sent the device-details screen request.

* * * * *